United States Patent [19]

Shimizu et al.

[11] Patent Number: 5,143,783
[45] Date of Patent: Sep. 1, 1992

[54] POROUS FILM OF POLYTETRAFLUOROETHYLENE AND PREPARATION THEREOF

[75] Inventors: Tetsuo Shimizu; Kazutaka Hosokawa, both of Osaka, Japan

[73] Assignee: Daikin Industries Ltd., Osaka, Japan

[21] Appl. No.: 435,170

[22] Filed: Nov. 13, 1989

[30] Foreign Application Priority Data

Nov. 18, 1988 [JP] Japan .................................. 63-293252

[51] Int. Cl.$^5$ ........................ B32B 5/116; B32B 27/32; B29D 27/04
[52] U.S. Cl. .................................... 428/327; 264/48; 264/127; 428/220; 428/422
[58] Field of Search ............... 428/421, 323, 327, 422; 264/48, 127; 204/266

[56] References Cited

U.S. PATENT DOCUMENTS

| 3,960,651 | 6/1976 | Kometani et al. ................. 428/421 |
| 4,196,070 | 4/1980 | Chao et al. .......................... 204/266 |

FOREIGN PATENT DOCUMENTS

| 0113869 | 7/1984 | European Pat. Off. ........... 428/327 |
| 1172527 | 2/1959 | France ............................... 428/421 |
| 2050778 | 4/1971 | France ............................... 204/266 |

Primary Examiner—Thomas J. Herbert, Jr.
Attorney, Agent, or Firm—Birch, Stewart, Kolasch & Birch

[57] ABSTRACT

A polytetrafluoroethylene porous film obtainable by applying an aqueous dispersion of emulsion polymerized polytetrafluoroethylene particles having an average minor particle size of 1 to 500 nm and an average aspect ratio of at least 10 on a substrate, drying the applied dispersion and optionally sintering the dried polytetrafluoroethylene particles on the substrate to obtain the polytetrafluoroethylene porous film, which has a uniform thin thickness.

6 Claims, 3 Drawing Sheets

POROUS FILM OF POLYTETRAFLUOROETHYLENE AND PREPARATION THEREOF

BACKGROUND OF THE INVENTION

1. Field of the Invention

The present invention relates to a porous film of polytetrafluoroethylene (hereinafter referred to as "PTFE") and preparation thereof. More particularly, the present invention relates to a porous film of PTFE which has a uniform thin thickness and is suitable for the production of sensors.

2. Description of the Related Art

The PTFE porous film is used as a filter, a waterproofing moisture-permeable clothing material, a sensor film and a cell separator. The PTFE porous film is often fabricated by paste extruding a fine powder of PTFE which is prepared by coagulating and drying emulsion polymerized PTFE powder and stretching an extruded film (first process) (cf. Japanese Patent Publication Nos. 13560/1967 and 18991/1976 and Japanese Patent Kokai Publication Nos. 156067/1979 and 152825/1984). Alternatively, the PTFE porous film can be fabricated by weaving fibers which are prepared by the so-called emulsion spinning of an aqueous dispersion of the emulsion polymerized PTFE particles (second process) or by forming a film from fibrils which are prepared by grinding the PTFE fine powder in a manner analogous to paper making or by sintering such fibrils under pressure (third process) (cf. Japanese Patent No. 21819/1987).

Although the PTFE porous film fabricated by the first process has good strength, the production steps are complicated and productivity is poor. It is difficult to fabricate a film having a thickness of less than 10 μm, since the film is broken during stretching to such a thin thickness. In general, the PTFE porous film fabricated by the first process has a thickness of 30 to 100 μm. In addition, the PTFE porous film fabricated by the first process has a heterogeneous structure which essentially consists of nodes and fibrils, and the node portions have no pores (see FIG. 1 which is a scanning electron microscopic photograph of the PTFE porous film fabricated by the stretching method at the magnification of 10,000x). It is further difficult to fabricate the thin porous film by the second and third processes.

In order to use the PTFE porous film as the film for various sensors with utilizing heat resistance, chemical resistance and compatibility with biological materials of PTFE and to increase sensitivity of the sensor, it is desired to provide a PTFE porous film having a thinner thickness.

SUMMARY OF THE INVENTION

One object of the present invention is to provide a PTFE porous film having a thinner thickness than the conventional PTFE porous films.

Another object of the present invention is to provide a process for producing a PTF( porous film having such thin thickness.

Accordingly, the present invention provides a PTFE porous film obtainable by applying an aqueous dispersion of emulsion polymerized PTFE particles having an average minor particle size of 1 to 500 nm and an average aspect ratio of at least 10 on a substrate, drying the applied dispersion and optionally sintering the dried PTFE particles on the substrate to obtain the PTFE porous film.

DETAILED DESCRIPTION OF THE DRAWINGS

In the PTFE porous film of the present invention, the emulsion polymerized PTFE particle; having the average minor particle size of 1 to 500 nm and the aspect ratio of at least 10 forms a two-dimensional network. The PTFE porous film of the present invention preferably has a porosity of at least 35%. Preferably, the film thickness is not larger than 10 μm, especially from 0.1 to 6 μm. This does not exclude the PTFE porous film having a thickness of larger than 10 μm. Further, the emulsion polymerized PTFE has a melting point of not lower than 327° C.

As the average aspect ratio increases, the fabrication of a thin film becomes easier and the porosity increases.

When the melting point of the emulsion polymerized PTFE is lower than 327° C., the porous film has insufficient strength and short life time in some end uses. When the porosity is less than 35%, the porous film has impractical permeability. Preferably, the porosity is at least 50% and does not exceed 97%. When the porosity exceeds 97%, the porous film is too weak.

Figure 1:
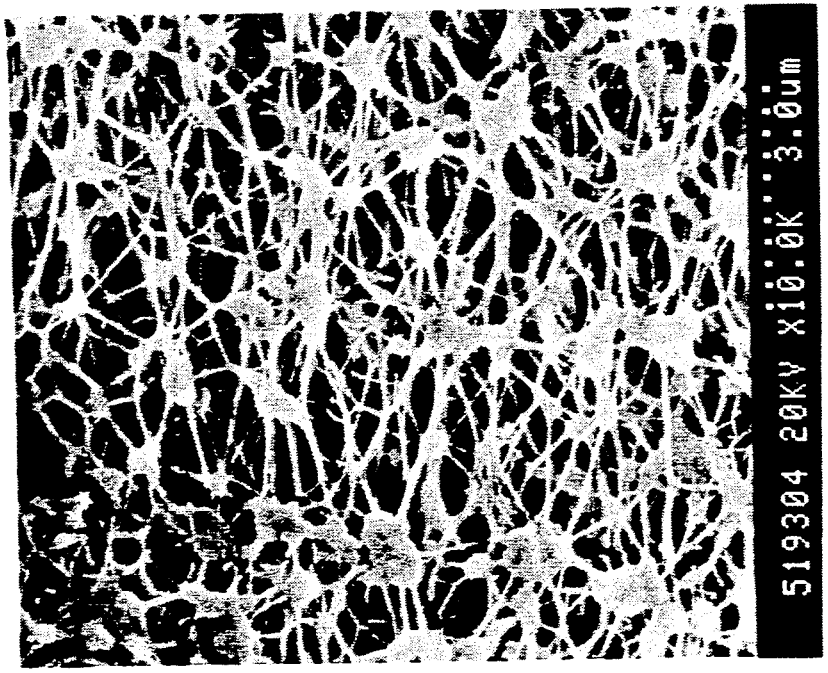
FIG. 1 is a scanning electron microscopic photograph of the PTFE porous film fabricated by the conventional stretching method.

Different from the conventional PTFE porous film fabricated by stretching (see FIG. 1) which consists of the nodes and fibrils, the PTFE porous film of the present invention contains no node that has no pores, and thus has large porosity. In addition, according to the present invention, it is possible to fabricate the PTFE porous film having pores of submicron order, namely less than 1 μm.

The dried PTFE particles are then sintered at a temperature higher than the melting point of PTFE. To prevent shrinkage, the edges of the dried film may be fixed or the dried film may be pressed during sintering.

It is known that the emulsion polymerized PTFE particles are prepared under such conditions that the aqueous medium has a low surface tension during polymerization. As the surface tension decreases, the aspect ratio of the prepared PTFE particles increases (cf. "Kobunshi Kako" (Polymer Processing), 30 (10), 473 (1981)). When a water-soluble fluorine-containing dispersant (emulsifier) is used in an amount not smaller than its critical micell concentration (CMC), the rodlike PTFE particles having the average minor particle size of 1 to 500 nm and the average aspect ratio of at least 10 which are used in the present invention (hereinafter referred to as "anisotropic emulsion polymerized PTFE particles") are produced. An aqueous dispersion containing the anisotropic emulsion polymerized PTFE particles often exhibits properties of a lyotropic liquid crystal and is disclosed as a raw material for emulsion spinning (cf. Japanese Patent Kokai Publication No. 31104/1988). The anisotropic emulsion polymerized PTFE particles to be used according to the present invention may be prepared by the process described in Japanese Patent Kokai Publication No. 81104/1988; U.S. patent application Ser. Nos. 871,244 and 008,913 filed on Jun. 6, 1986 and Jan. 30, 1987, respectively, the disclosures of which are hereby incorporated by reference; and EP-A 248 446.

In the process of the present invention, the aqueous dispersion of anisotropic emulsion polymerized PTFE particles is cast on a substrate to form a thin film. In the casting of the aqueous dispersion of conventional emulsion polymerized PTFE fine particles, the aqueous dispersion of a low concentration of the PTFE particles is used or the aqueous dispersion of a slightly high concentration of the PTFE particles is thinly spread over the substrate, and then the aqueous dispersion is dried and sintered to form a thin film. However, since the conventional emulsion polymerized PTFE fine particles have the average aspect ratio of less than 2 and since they insufficiently adhere to each other in the unsintered state, no thin film having the practical strength can be obtained and no porous film can be obtained after sintering. It is possible to fabricate the PTFE porous thin film by casting only from the anisotropic emulsion polymerized PTFE particles.

The aqueous dispersion of anisotropic emulsion polymerized PTFE particles used in the present invention usually has a concentration of from 0.1 to 25% by weight, preferably from 0.5 to 3% by weight. The aqueous dispersion from the polymerization step having the above concentration may be used, or the concentration of the aqueous dispersion from the polymerization step may be diluted with water to adjust the concentration in the above range. Preferably, the aqueous dispersion from the polymerization step is dialyzed to removed the emulsifier.

Any substrate with a flat surface may be used. Examples are a glass plate, a metal plate, a polymer film or sheet and the like. To obtain the thin porous film, preferably the aqueous dispersion contains the anisotropic emulsion polymerized PTFE particle in a low concentration. To obtain a uniform porous film, preferably, the low concentration aqueous dispersion is applied several times.

The applied aqueous dispersion is dried at a temperature not lower than room temperature and lower than the melting point of PTFE. In some cases, the dried film can be sintered at a temperature of from 330° to 380° C.

In the present invention, since the aqueous dispersion of anisotropic emulsion polymerized PTFE particles can form a film even at a low concentration of the PTFE particles, the dispersion may contain the emulsion polymerized PTFE particles having the average aspect ratio of less than 2, other polymer particles and/or fillers. The solid content of such additive material is not larger than 400 part by weight, preferably not larger than 150 parts by weight per 100 parts of the anisotropic emulsion polymerized PTFE particles (solid).

Preferably, an aqueous dispersion of colloidal particles cf a melt processable fluorine-containing polymer can be added to the aqueous dispersion of anisotropic emulsion polymerized PTFE particles. Examples of the melt processable fluorine-containing polymer are perfluoro(alkyl vinyl ether)/tetrafluoroethylene copolymer (PFA), hexafluoropropene/tetrafluoroethylene copolymer (FEP), ethylene/tetrafluoroethylene copolymer (ETFE), polychlorotrifluoroethylene (PCTFE), etc. In case of mixing such melt processable polymer, the heat treatment of the fabricated porous film increases the film strength.

PREFERRED EMBODIMENTS OF THE INVENTION

The present invention will be illustrated by the following Examples.

The properties of the PTFE particles are measured as follows:

Melting point

By using a differential scanning calorimeter (DSC), the PTFE particles are heated from 250° C. to 360° C. at a heating rate of 10° C./min. and a melting curve is recorded. The melting point is defined as the temperature corresponding to the maximum peak.

Particle Size and Aspect Ratio of PTFE Particles

The particle size and the aspect ratio of the PTFE particles are measured by using a transmission electron microscope.

To increase dispersibility of the PTFE particles, a polymer latex is diluted with water to a polymer solid content of about 0.005% by weight and dialyzed with a cellophane tube for 3 days. Then, the dispersion is dropped on a collodion film and observed with the electron microscope.

It is difficult to take a photograph of the aqueous dispersion of anisotropic emulsion polymerized PTFE particles which is in the liquid crystal state with the particles being well dispersed. Then, 50 to 100 particles which are dispersed independently as much as possible are selected and their minor particle sizes are measured and arithmetically averaged to obtain the average minor particle size. Measurement of the average major particle size is further difficult since the major particle sizes cannot be measured for overlapped particles or bent particles. In the present measurement, with the overlapped particles, the crossing point is assumed to be a particle end and with the bent particles, a bent point is assumed to be a particle end. Then, the actual major particle size and the aspect ratio are larger than the measured values.

EXAMPLE

Preparation of PTFE Particles

In a one liter stainless steel (SUS 316) autoclave equipped with stainless steel made anchor type agitation blades and a temperature regulating jacket, deionized water (540 ml) and ammonium perfluorooctanoate (16.5 g) were charged. The internal atmosphere of the autoclave was replaced with nitrogen gas three times and with tetrafluorcethylene (TFE) gas twice while warming to purge oxygen. Internal pressure was raised to 5.5 kgf/cm$^2$ with injection of the TFE gas, and the content was stirred at 500 rpm at 77° C. Then, a solution of potassium persulfate (KPS) (27.5 mg) in water (5 ml) was injected with TFE to increase the internal pressure to 5.75 kgf/cm$^2$. Although the reaction proceeded in an accelerated manner, the reaction temperature was kept at 77° C. and the stirring was continued at 500 rpm. The internal pressure was kept at 5.75 kgf/cm$^2$ with continuous addition of TFE.

After 67 minutes from the addition of KPS, stirring and supply of TFE were stopped, and the interior gas was purged to atmospheric pressure to terminate the reaction.

A part of the obtained polymer latex was evaporated to dryness and washed with acetone. From the weight of the solid polymer, the polymer concentration in the latex was calculated to be 3.5% by weight. The melting point of the polymer was 330° C.

As reported in Japanese Patent Kokai Publication No. 81104/1988, the aqueous dispersion of obtained PTFE particles was separated into two layers. The volume ratio of upper layer to lower layer was about 89:11, and the polymer concentrations in the upper and lower layers were 2.7% by weight and 6.8% by weight, respectively. A slight amount of each layer was diluted with water and observed with the transmission electron microscope and was found that both layers contained the rod-like PTFE particles and that the particles in the upper layer had the smaller major particle size and narrower particle size distribution than those in the lower layer. The average minor particle size and the average aspect ratio of the PTFE particles in the lower layer were 6 to 12 nm and at least 150, respectively.

Fabrication of PTFE Film

The lower layer was diluted with water to the polymer concentration of 1.5% by weight, and 4 ml of the diluted dispersion was spread over a glass plate having an area of 13 cm$^3$ and dried at room temperature.

The film formed on the glass plate was wet with methanol and peeled off with a pincette with its form being maintained. The average film thickness was 5 μm. With the assumption that the density of PTFE was 2.2 g/cm$^3$, the film density was calculated to be 0.9 g/cm$^3$ from the total solid weight, the film area and the film thickness. According to the equation: Porosity (%)=(1−film density/2.2)×100, the porosity was calculated to be about 60%.

Figure 2:
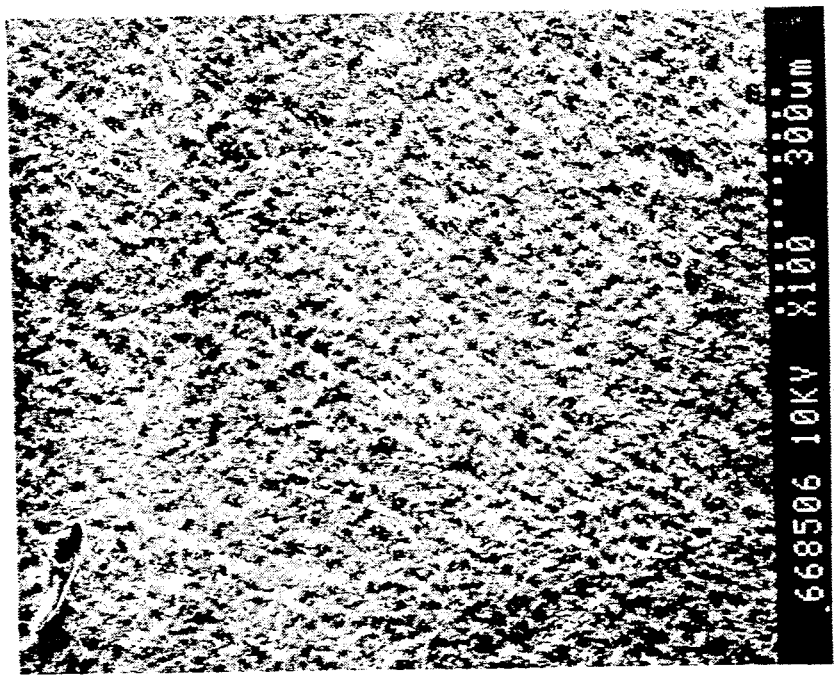
FIGS. 2, 3 and 4 are scanning electron microscopic photographs of the PTFE porous film obtained in the Example according to the present invention.
Figure 3:
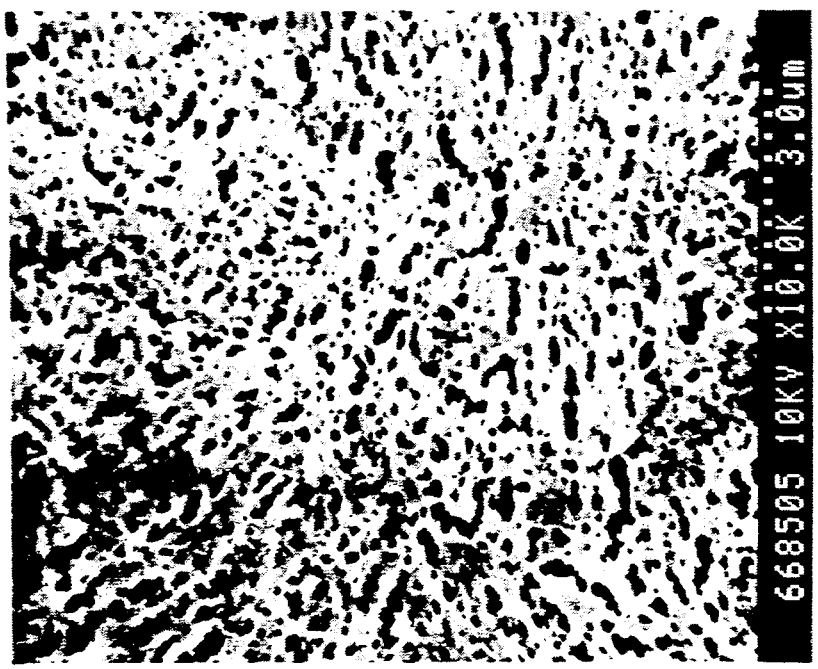

The condition of the film surface was observed with the scanning electron microscope. The photographs are shown in FIGS. 2 and 3 at the magnifications of 100x and 10,000x, respectively. From FIG. 2, it is understood that the surface seemed to be smooth, while from FIG. 3, it is understood that the film had many pores.

Figure 4:
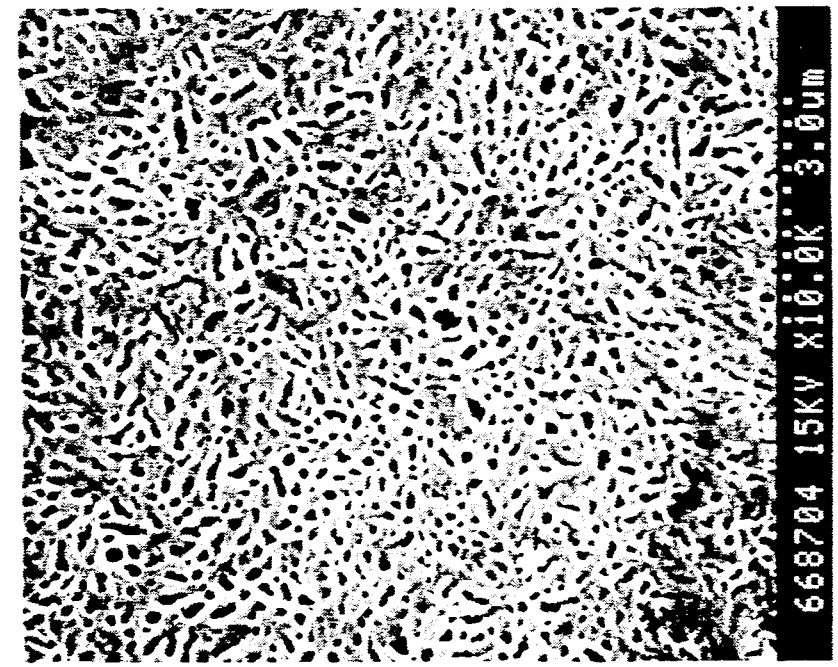

The PTFE thin film was fabricated in the same manner as above and heated on a glass plate placed in an electric furnace kept at 340° C. for one minute. The film area shrank by 60% to give a film having the average film thickness of 10 μm. The porosity of this film was calculated to be 65%. The surface of the film was observed with the scanning electron microscope. The photograph is shown in FIG. 4 at the magnification of 10,000x. The average pore size was measured to be 0.12 μm.

Comparative Example

Preparation of PTFE Particles;

In a one liter glass autoclave equipped with stainless steel made anchor type agitation blades and a temperature regulating jacket, deionized water (540 ml) and ammonium perfluorooctanoate (0.55 g) were charged. The internal atmosphere of the autoclave was replaced with nitrogen gas three times and with TFE gas twice while warming to purge oxygen. Internal pressure was raised to 9.5 kgf/cm$^2$ with injection of the TFE gas, and the content was stirred at 500 rpm at 70° C. Then, a solution of ammonium persulfate (APS) (11.6 mg) in water (5 ml) was injected with TFE to increase the internal pressure to 10 kgf/cm$^2$. During the reaction, the internal pressure was kept at 10 kgf/cm$^2$ with continuous addition of TFE, the reaction temperature was kept at 70° C. and stirring was continued at 500 rpm.

After 140 minutes from the addition of APS, the polymer concentration was 16.2% by weight, and the melting point of PTFE was 342° C.

Observation of the PTFE particles with the transmission electron microscope revealed that the average minor particle size was 130 nm and the average aspect ratio was 1.5.

Fabrication of PTFE Film

Figure 6:
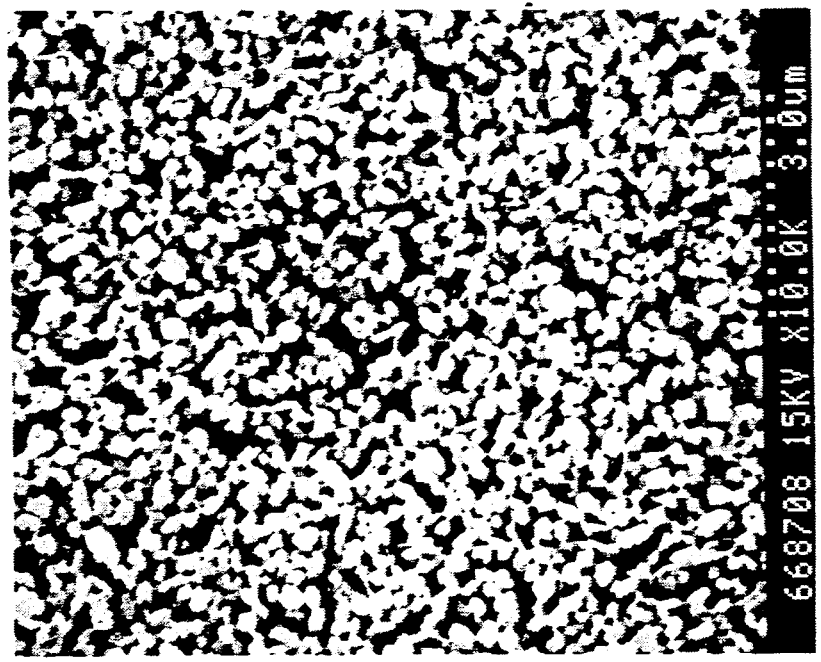
FIGS. 5 and 6 are scanning electron microscopic photographs of the PTFE porous film obtained in the Comparative Example.
Figure 5:
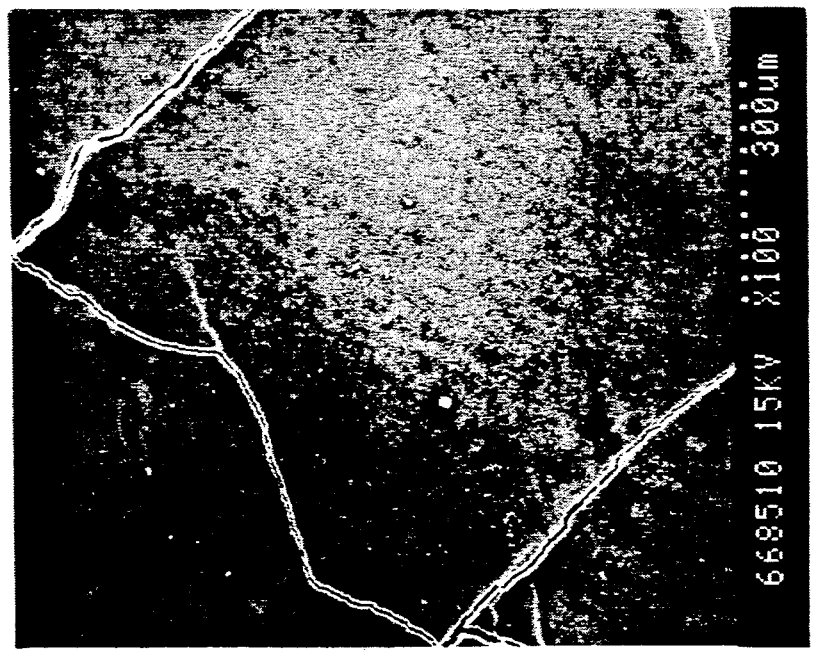

In the same manner as in the Example, from the aqueous dispersion which was diluted to the solid content of 1.5% by weight, a film was fabricated. However, the dried film was severely cracked. When the film was wet with methanol and peeled off with the pincette, the film broke into small pieces. The scanning electron microscopic photographs of the small piece are shown in FIGS. 5 and 6 at the magnifications of 100x and 10,000x, respectively. FIG. 5 shows cracking, and FIG. 6 shows that the PTFE particles were discrete.

What is claimed is:

1. A process for producing a polytetrafluoroethylene porous film consisting essentially of applying an aqueous dispersion of emulsion polymerized polytetrafluoroethylene particles having an average minor particle size of 1 to 500 nm and an average aspect ratio of at least 10 on a substrate, drying the applied dispersion to obtain the polytetrafluoroethylene porous film.

2. The process according to claim 1, wherein said average aspect ratio is at least 50.

3. The process according to claim 1, wherein said emulsion polymerized polytetrafluoroethylene has a melting point of at least 327° C.

4. The process for producing a polytetrafluoroethylene porous film according to claim 1, wherein the concentration of the emulsion polymerized polytetrafluoroethylene particles comprised in the aqueous dispersion is from 0.1 to 25% by weight.

5. The process for producing a polytetrafluoroethylene porous film according to claim 1, wherein the concentration of the emulsion polymerized polytetrafluoroethylene particles comprised in the aqueous dispersion is from 0.5 to 3% by weight.

6. The process for producing a polytetrafluoroethylene porous film according to claim 1, which further comprises sintering the dried polytetrafluoroethylene particles on the substrate to obtain the polytetrafluoroethylene porous film.

* * * * *